United States Patent [19]

Lüscher

[11] Patent Number: 4,552,285

[45] Date of Patent: Nov. 12, 1985

[54] UNLOADING DEVICE

[75] Inventor: René Lüscher, Regensdorf, Switzerland

[73] Assignee: Gretag Aktiengesellschaft, Regensdorf, Switzerland

[21] Appl. No.: 581,564

[22] Filed: Feb. 21, 1984

[30] Foreign Application Priority Data

Mar. 10, 1983 [CH] Switzerland ........................ 1286/83

[51] Int. Cl.[4] ............................................ B65G 59/06

[52] U.S. Cl. ........................................ 221/13; 221/56; 271/165; 414/125; 414/907

[58] Field of Search ....................... 414/125, 126, 907; 221/13, 56, 59, 279; 271/147, 154, 155, 165

[56] References Cited

U.S. PATENT DOCUMENTS 1,922,575 8/1933 Fenner ............................... 271/165
4,106,764 8/1978 Tamura .......................... 271/165 X

FOREIGN PATENT DOCUMENTS 1111015 4/1968 United Kingdom ................ 221/279

*Primary Examiner*—Leslie J. Paperner
*Attorney, Agent, or Firm*—Burns, Doane, Swecker & Mathis

[57] ABSTRACT

Flat objects, such as disk shaped print masters, that are stacked in a magazine are pressured by an ejector against the ejection orifice of the magazine. A support surface for the ejected object is located under the ejection orifice. The ejector is actuated by an ejector drive, which stresses the ejector until an object is ejected onto the support surface and the counter pressure generated by the ejected object attains a certain limiting value. The ejector is subsequently relieved. The apparatus makes it possible to eject the objects individually from the magazine in a reliable and precise manner with a relatively small effort.

4 Claims, 25 Drawing Figures

12
13
15
30
32
33
31
36
16
14
27
26
35
11
25
37
G
21
22
24
23
D
39
41
40
42
DN
43
44
45
TR
AO
34
28
DK

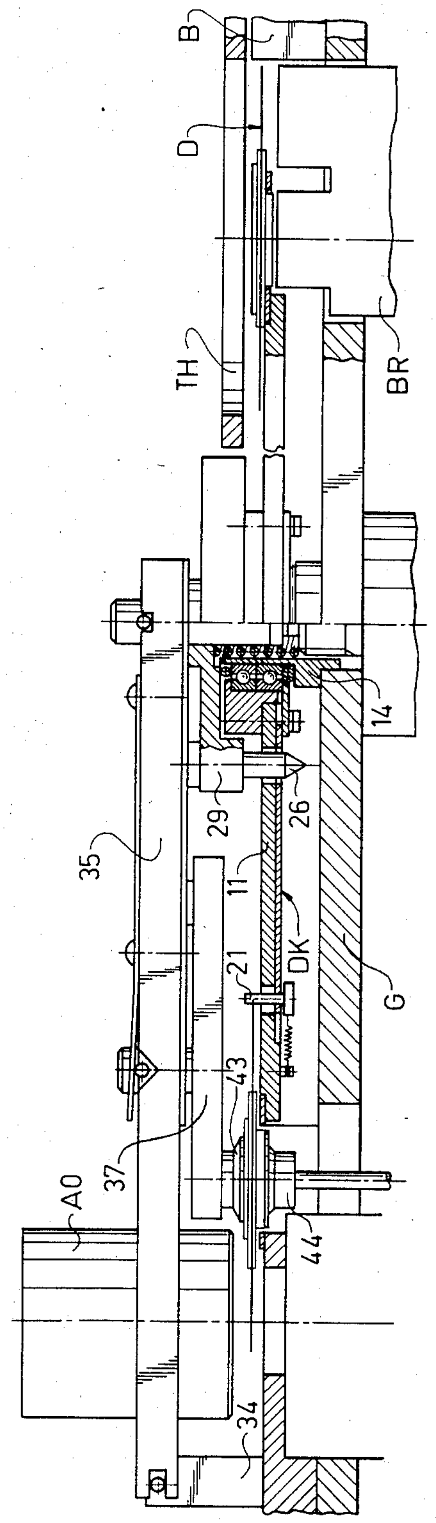
Fig. 15/2
Fig. 15/1

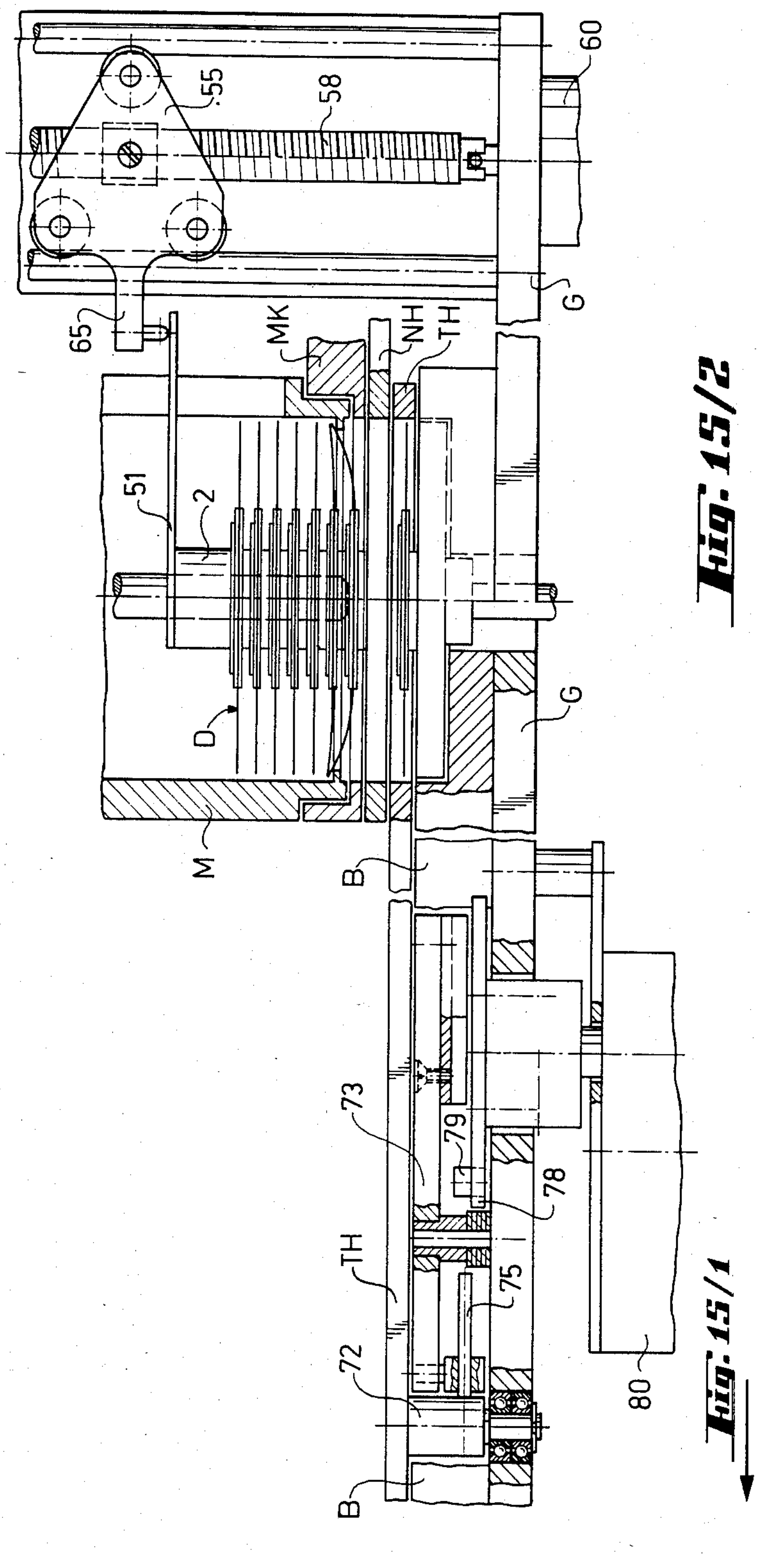
Fig. 15/2
Fig. 15/1

UNLOADING DEVICE

BACKGROUND OF THE INVENTION

The present invention relates to a device for the unloading of flat objects consisting of a flat, relatively rigid center part and an elastically deformable circumferential part from a magazine in which they are stacked on one another.

It is the object of the invention to provide a device of this type, whereby the unloading of individual objects is assured reliably with the smallest effort possible.

In the detailed following description of a preferred embodiment, the invention is described in connection with an automatic printing device for disk like print masters. It will be appreciated, however, that the invention is suitable not only for the unloading of masters of this type from a master magazine, but also for the discharge of any other flat object from any other magazine or the like.

BRIEF DESCRIPTION OF THE DRAWINGS

FIG. 15 is a sectional view through the entire transport mechanism of the master disks taken along the line XV—XV of FIG. 3.

DESCRIPTION OF THE ILLUSTRATED EMBODIMENT

Figure 1:
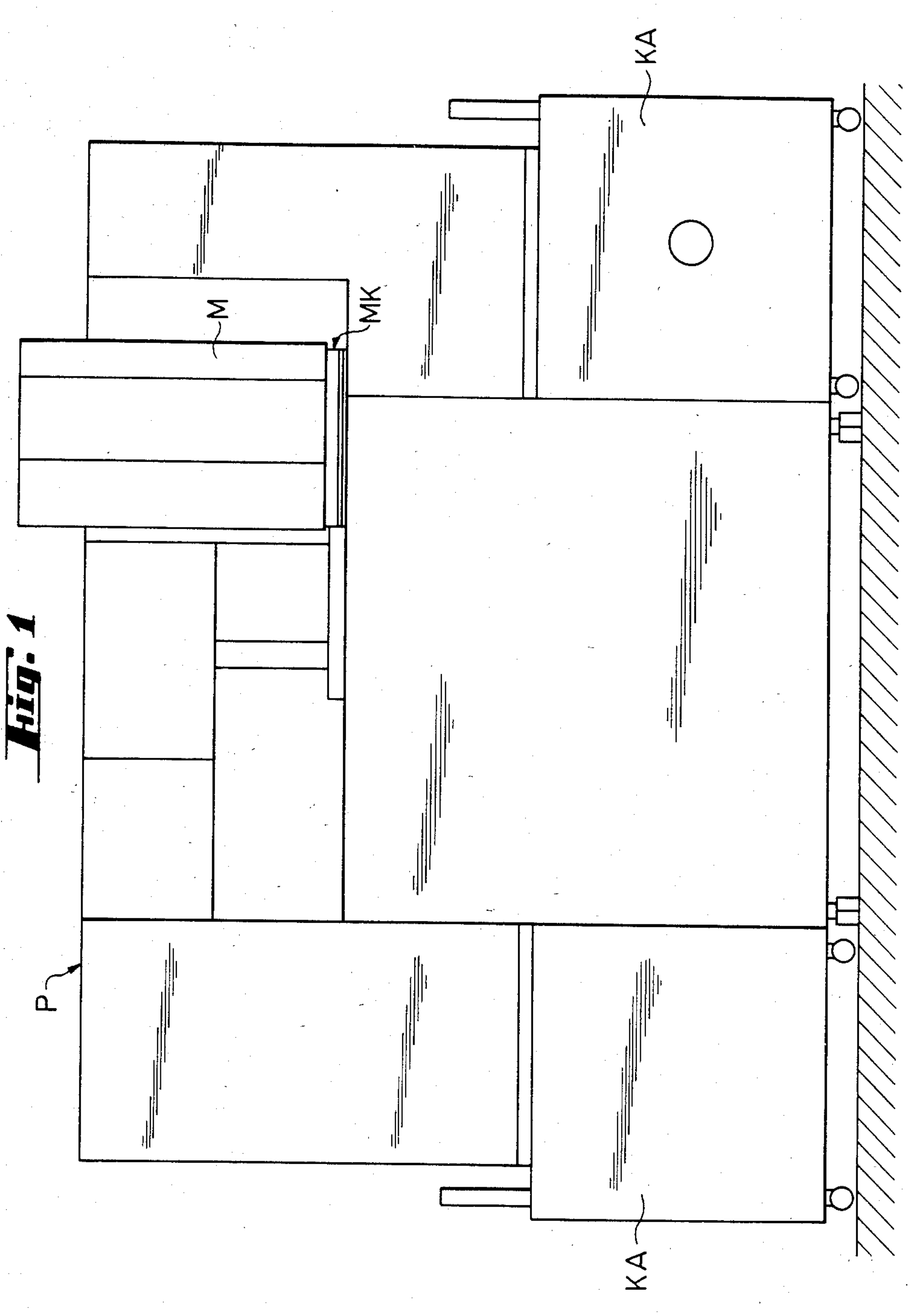
FIG. 1 shows a simplified front elevation of an embodiment of a printing installation implementing the invention, FIG. 2 a plan view of the apparatus with a schematic indication of the transport path of the print masters.

The external configuration of the printing installation according to the invention is shown in FIG. 1. It corresponds extensively to the automatic printer 3141 of Gretag AG, Regensdorf, Switzerland, for print masters in strip form, and consists of the printing apparatus P proper, housed in a cabinet-like housing, the so-called printer, and two cassettes KA coupled with said printer, for the unexposed and the exposed photographic paper. In contrast to this known printing apparatus, the device according to the invention is laid out for the processing of print masters in disk form. Aside from this difference and the associated design details, the printing apparatus corresponds extensively to the known printer 3141, especially in relation to the technical aspects of the printing operation itself (photoelectric measuring of the print masters, exposure, exposure control, etc.), so that the description below may be restricted to the differences due to the disk shape of the print masters.

The disk shaped masters, designated hereafter for the sake of brevity as "disks," are located conventionally in a standardized double magazine M, wherein they are threaded on two mandrels or spindles each located in a magazine chamber. Each magazine chamber has a capacity of up to approximately 105 disks (see for example the so-called disk magazine 2610/3510 produced by the Eastman Kodak Corp).

The printing apparatus is equipped with means, to be described in detail below, to remove the disks successively from the magazine, transport them to a series of treatment and processing stations and then store them in another (empty) magazine.

Figure 2:
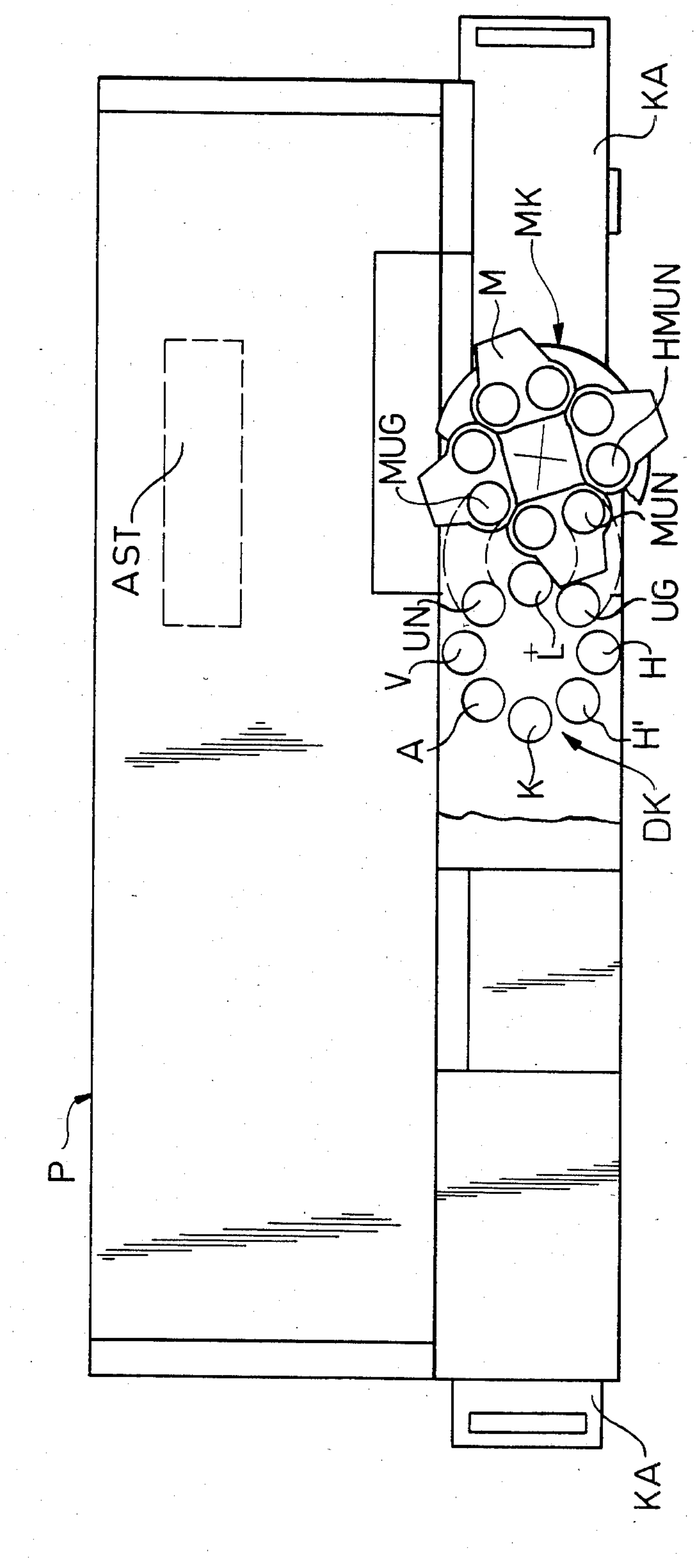

The transport path of the disks is shown schematically in FIG. 2. Four double magazines M are located on a magazine carrousel MK. Only two of the magazines M are active at any one time. One of them (the delivery magazine) contains the disks to be copied, the other (the receiving magazine) accepts the disks after the printing process. The remaining two magazines contain additional disks or disks that have already been printed and serve to maintain a continuous printing operation.

From the active, full delivery magazine the disks arrive on a disk carrousel, which transports them from a transfer location UN along a circular transport path, through a preparation station V, a scanning station A and a printing station K, to a transfer station UG, from where they are moved into the waiting, empty receiving magazine. The circular transport path comprises, as seen in the drawing, eight stations. Five of them have already been mentioned; another one (H) serves for the manual insertion of the test disks for example. The station H' is normally not used and the station L is an empty location which is never entered by the disks coming from the magazines. Only the disks inserted manually in the manual feed station H pass through this empty location.

In the prepartion station V the disks are brought into an accurately defind rotational position (the so-called home position), wherein a certain image field is located radially outward. Simultaneously, any potentially present dust is removed from the disks. The optical and magnetic information on the disks is read.

In the scanning station A all image locations (images of each individual disk) are successively photoelectrically measured point-by-point. The measured values are stored and processed into exposure data.

In the printing station K the image locations of the disks are exposed in keeping with the exposure data obtained from the measured values. The control of the exposures is effected exactly as in the case of the conventional strip printing installations and thus needs no special explanation.

Details concerning the preparation station V, the scanning station A and the printing station K can be found, for example, in U.S. Pat. Nos. 4,203,664 and 4,204,733, so that further discussion herein is not necessary. Further reference is made to the aforementioned disk attachment 70/90 for the printer 3510 of Eastman Kodak Corp.

In the following description, the transporation of the disks and the necessary means are explained in detail with reference to FIGS. 3–9.

The four double magazines M are located, as mentioned above, on a magazine carrousel MK, which is rotationally driven in steps. The magazine carrousel has, in keeping with the total of eight disk spindles in the four double magazines M, eight discrete rotary positions. Three of these rotary positions have special functions. In the position designated MUG the disks are unloaded from the magazine (half magazine) and at the MUN position they are normally returned into the empty magazine. The HMUN position is provided for the reloading of disks which are still on the transport path, when the magazine carrousel has already been rotated one step further. All of the remaining rotary locations or positions are idle positions wherein no disks are loaded or unloaded to or from the transport path.

Figure 3:
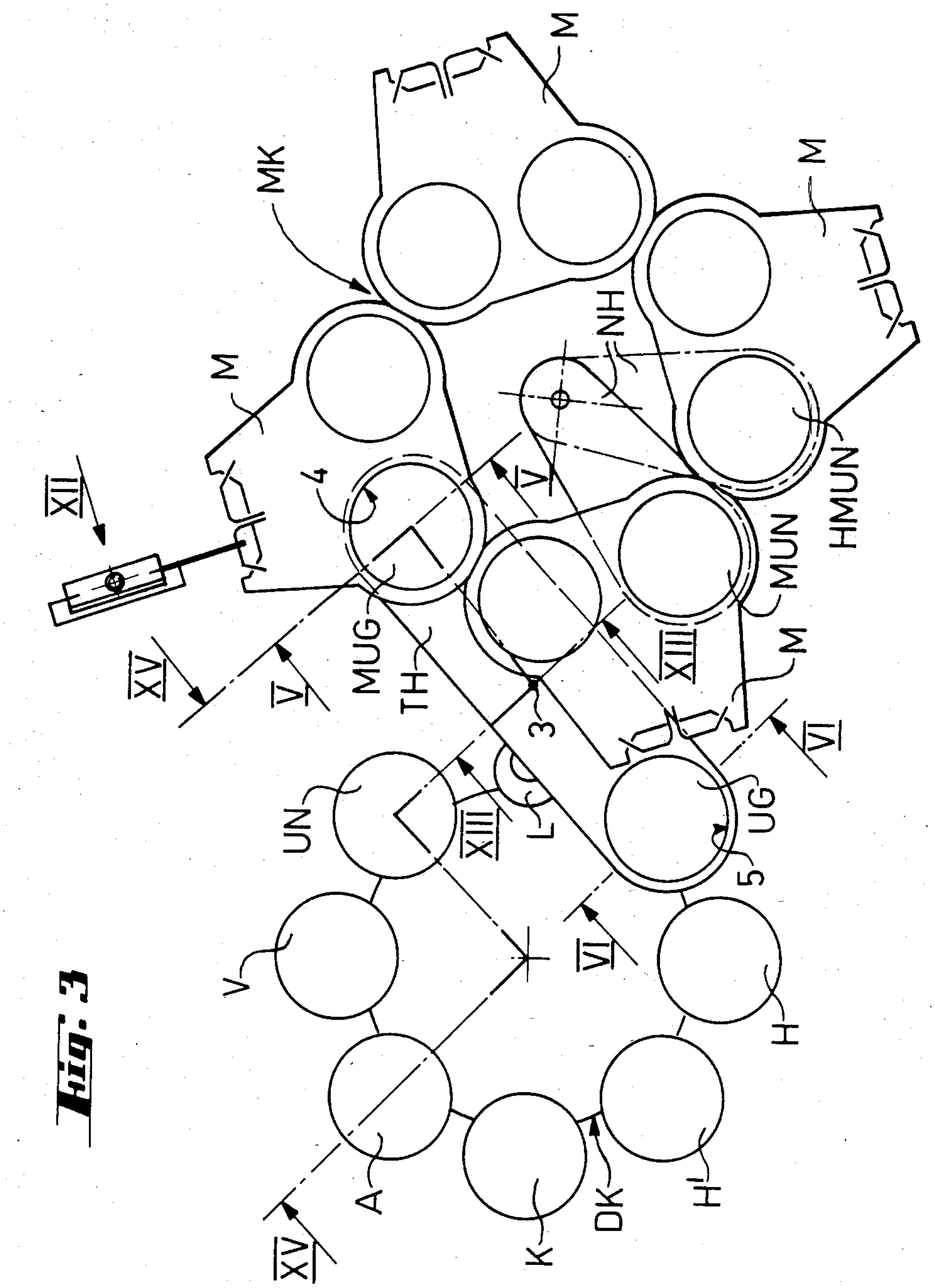
FIGS. 3 and 4 are schematic views of the means of transportation of the print masters in two characteristic movement phases.
Figure 4:
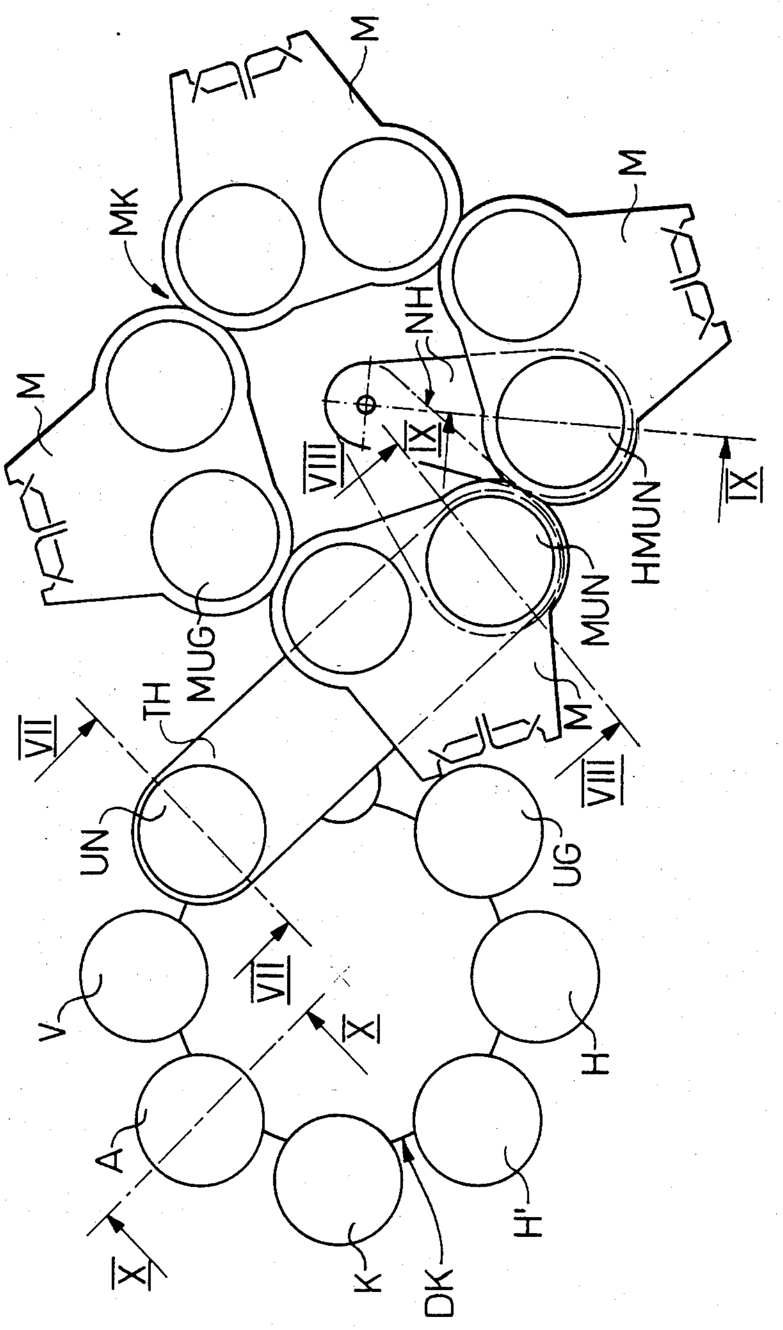
Figure 5B:
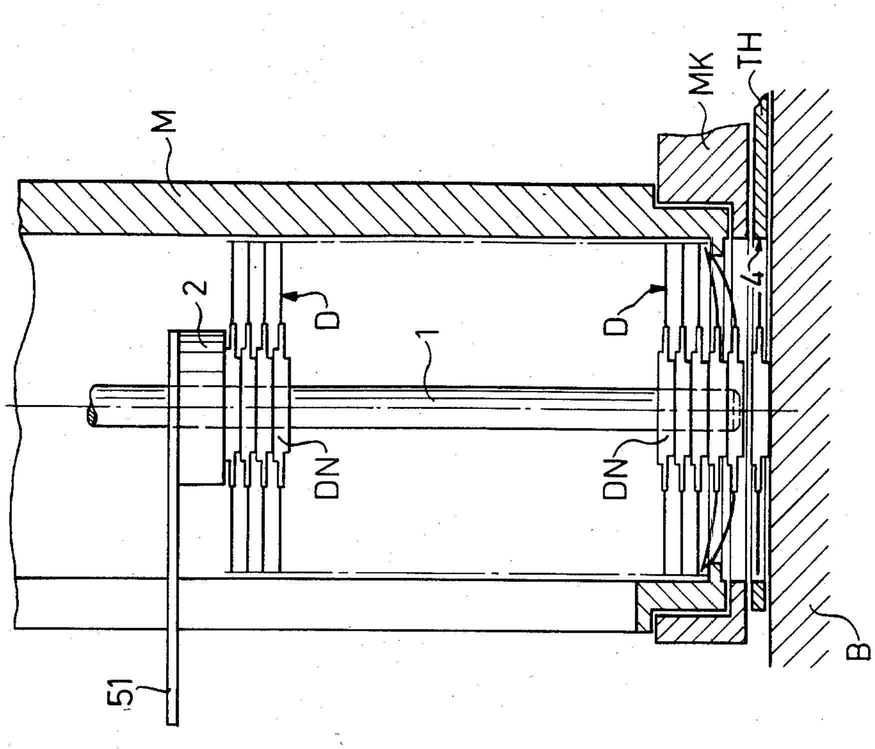
FIGS. 5*a* and 5*b* are detailed sectional views through the apparatus along the line V—V of FIG. 3, FIGS. 6*a* and 6*b* are detailed sectional views along the line VI—VI of FIG. 3, FIGS. 7*a* and 7*b* are detailed sectional views along the line VII—VII of FIG. 4, FIGS. 8*a*–8*c* are detailed sectional views along the line VIII—VIII of FIG. 4, FIGS. 9*a* and 9*b* are detailed sectional views along the line IX—IX of FIG. 4, FIGS. 10*a* and 10*b* are detailed sectional views along the line X—X of FIG. 4, FIGS. 11*a* and 11*b* are detailed top views of FIGS. 10*a* and 10*b*, respectively.
Figure 5A:
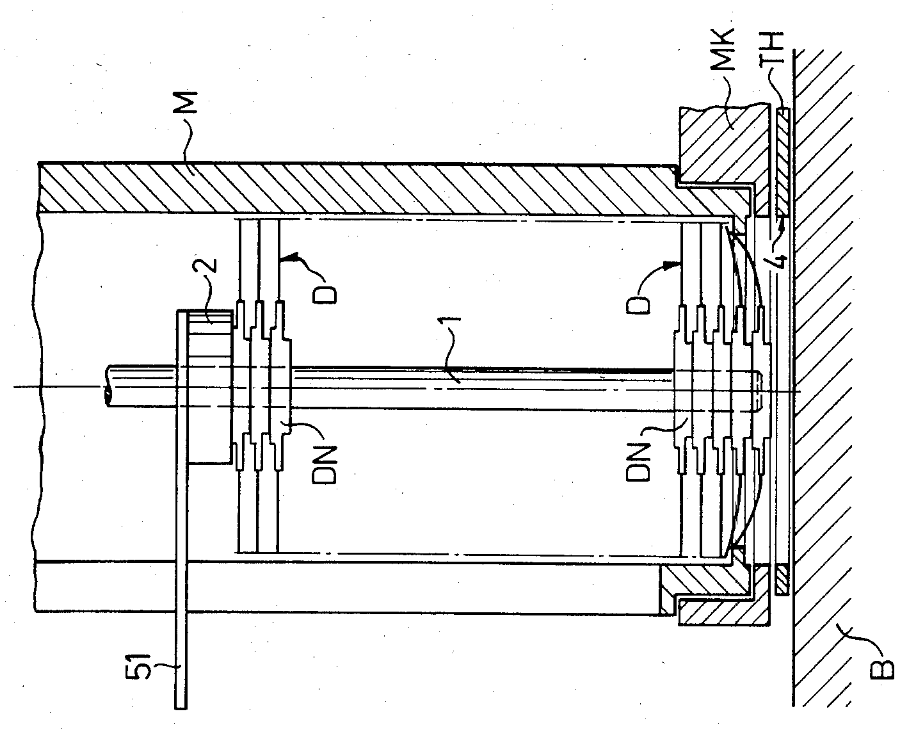

FIGS. 3 and 4 show the position of the individual tranpsort elements at the onset of a loading-unloading cycle. In the magazine M (magazine half) located at the magazine transfer station MUG a series of disks D is contained on a vertical spindle 1. The lowermost disk is ejected by means of an ejector 2 (in a manner to be described in detail) in the downward direction so that it will come to rest with its hub DN on a staionary stage B. In the plane between the stage B and the magazine carrousel MK, a connecting device in the form of a double arm transport lever TH pivots around an axle 3 between its two terminal positions shown in FIGS. 3 and 4. The transport lever TH has a circular recess 4 and 5 on each of its ends respectively, to receive a disk D. FIG. 5*b* shows the case wherein the disk D ejected from the magazine M is located in the recess 4 of the transport lever TH.

Figure 7B:
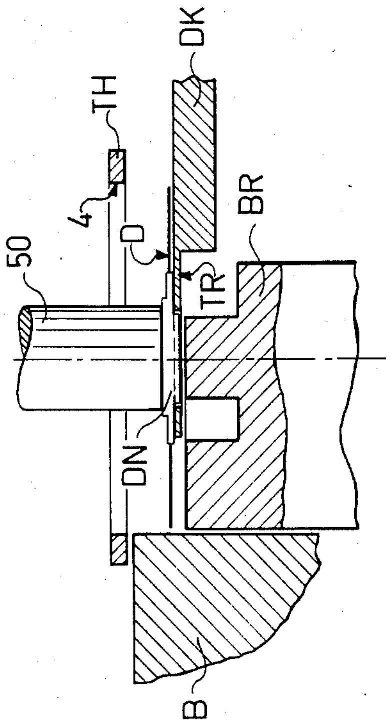
Figure 7A:
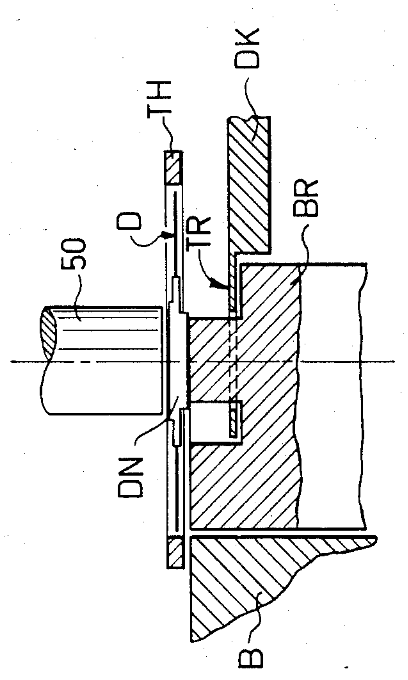

As the next step, the transport lever TH is pivoted by 90° into the position shown in FIG. 4, whereby the disk D located in its recess 4 is transported into the receiving station UN of the disk carrousel DK. During transportation, the disk slides on a raised bridge BR so that it cannot drop from the transport lever downward (see also FIG. 15). As soon as the disk D arrives in the receiving station UN (FIG. 7*a*), the bridge BR is lowered and the disk D comes to rest with its hub DN on or in a support ring TR of the disk carrousel DK (FIG. 7*b*). The descending movement is supported by a vertically movable pin 50.

The transport lever TH now pivots back into its initial position shown in FIG. 3 and the disk carrousel DK simultaneously rotates by one step, so that the disk just arriving at the receiving station UN is moved into the preparation station V.

Figure 6B:
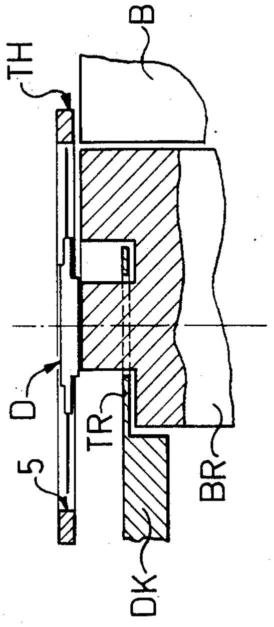
Figure 6A:
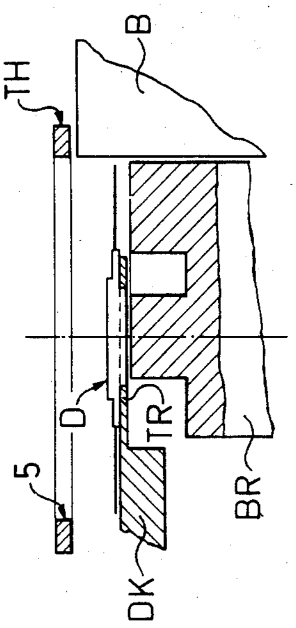
Figure 8B:
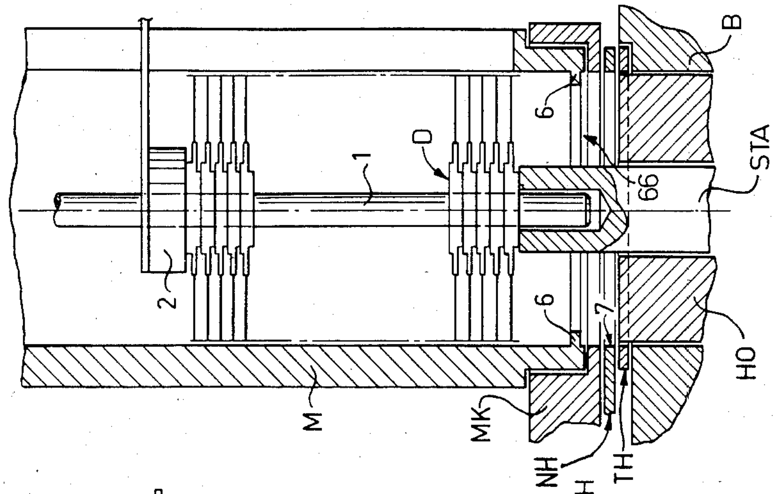
Figure 8C:
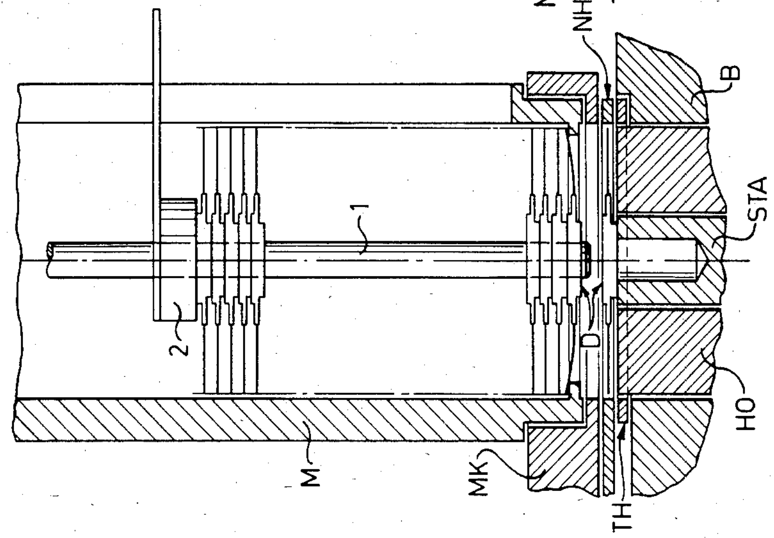
Figure 8A:
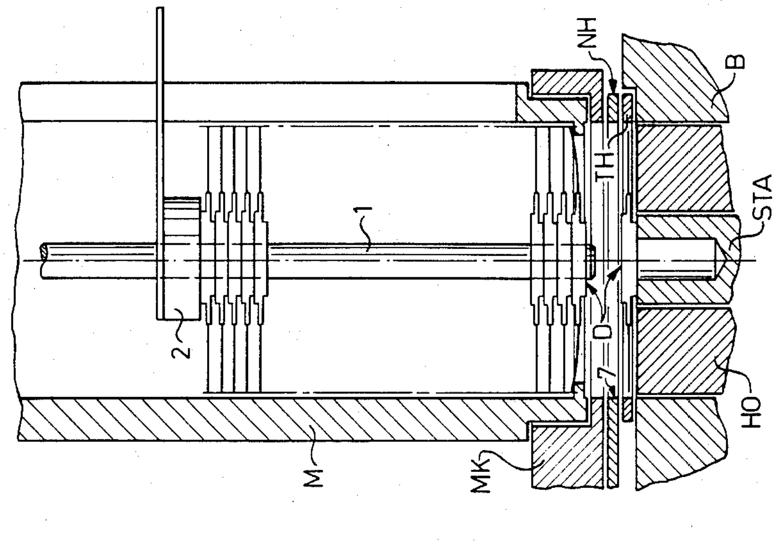

The reloading of the disks from the terminal position UG of the transport path on the disk carrousel DK into the empty magazine is effected in an analogous manner. In the position shown in FIG. 3, the recess 5 of the transport lever TH is in the transfer station UG of the disk carrousel DK (FIG. 6*a*). By raising the bridge BR to the level of the stage B, the disk D located in the disk carrousel DK is lifted from the transport ring TR and moved into the receiving orifice 5 of the transport lever TH (FIG. 6*b*). During the subsequent pivoting of the transport lever TH into the position shown in FIG. 4, the disk D is moved into the receiving position MUN of the magazine carrousel MK (FIG. 8*a*). A stacking element STA is located at this point in the stage B, which raises the disc D and inserts it into the magazine located in this position. The dropping of the disk from the magazine is prevented by inward projections 6 in the vicinity of the ejection orifice 66 at the lower end of the magazines (FIG. 8*b*).

In the manner described above, the disks are successively unloaded from the magazine standing in the transfer staion MUG, transported by means of the transport lever TH onto the disk carrousel DK, brought into the receiving station MUN after passing through the transport path provided by the carrousel and finally moved into an empty or receiving magazine.

When the magazine (more accurately one-half of the magazine) in the transfer location MUG of the magazine carrousel MK is empty, the carrousel rotates another step, so that then for example the second magazine half or the first half of a new double magazine is in the transfer location MUG. The same is true for the magazine (halves) in the receiving location MUN.

Following the further rotation of the carrousel MK there are still six disks of the previously emptied magazine half on the carrousel DK. In order to maintain the correlation between the disks and the magazine halves, i.e., that all disks coming from one half of a magazine are again loaded into the same half of an empty magazine, follower transport means are provided, which transport the aforementioned remaining six disks to the magazine (respectively the magazine half) which in the meantime has moved on.

These follower transport means comprise a follower lever NH pivotable around the axle of the carrousel MK between the receiving location MUN and the auxiliary receiving station HMUN, in the plane between the transport lever TH and the carrousel MK (FIGS. 8*a–c*, 9*a* and *b*). This follower lever NH has on its free end a receiving orifice 7 for the disks D, similar to the orifices 4 and 5 of the transport lever TH.

Figure 9B:
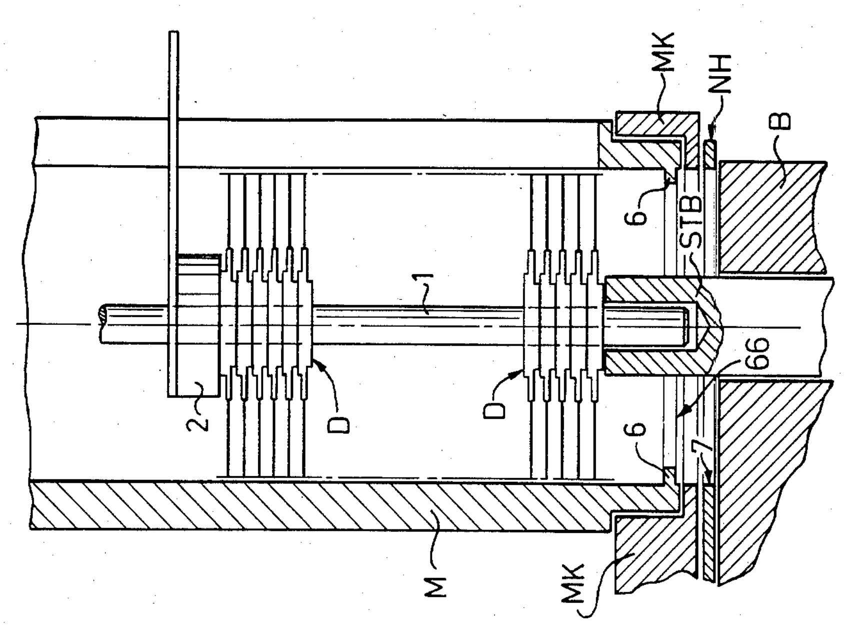
Figure 9A:
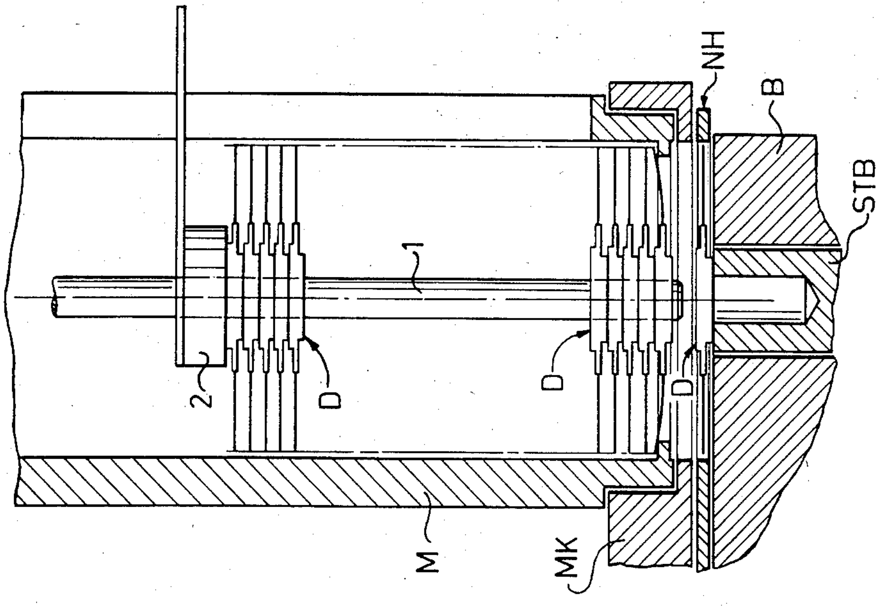

Appropriate control means are provided to insure that after the further advance of the carrousel the first six disks arriving in the receiving position MUN are not introduced directly into the magazine M that is positioned above it, but rather are transported by one step of the carrousel MK into the auxiliary receiving position HMUN and inserted into the magazine located therein. For this purpose, a lifting element HO, together with the stacking element STA, raises the disks to the level of the follower lever NH (FIG. 8*c*) and the latter transports them into the auxiliary receiving position HMUN (FIG. 9*a*). In the latter position a second stacking element STB is provided, which then inserts the disks D in the magazine M located above them (FIG. 9*b*), as does the stacking element STA in the normal receiving position MUN. The follower lever NH then pivots back and brings the next disk, etc., until all six disks are loaded in the proper magazine. The follower lever NH then remains inactive until the carrousel MK performs a new transport step.

In place of the pivoting follower lever NH an additional carrousel, that rotates coaxially with the magazine MK and that is equipped with the appropriate disk receiving orifices, can be provided.

Of the four double magazines M on the magazine carrousel MK always only two are active at any one time: one contains the disks to be printed, the other receives the processed disks. Following the advance of the carrousel MK the original delivery magazine (or half, respectively) becomes the receiving magazine and the place of the original delivery magazine (one half, respectively) is taken by the second half of the same magazine or the first half of a new magazine. The other two magazines are temporarily inactive, except for the time during which the aforementioned remaining six disks are retransported. During this time they may then be taken from the carrousel, unloaded and replaced by new magazines filled with new disks to be processed. In this manner, the uninterrupted operation of the printing apparatus is assured. A lock is provided to insure that during the retransportaton of the six disks the involved magazine cannot be taken from the carrousel.

In the embodiment described above the correlation of the disks with the same magazine is assured by the subsequent transport of the critical six disks to the advanced receiving magazine. The problem could also be solved—even though with a greater practical effort—by providing two magazine transfer locations, the existing one and an additional one arranged one step ahead of it, and taking six disks from the following full magazine after the emptying of the preceding one, prior to an advance movement of the carrousel.

In the preceding embodiment the disk magazines are arranged on a magazine carrousel. In place of the carrousel any other means of transportation could be used, provided that it has a certain storage capability, i.e., space for at least three or more magazines and is able to guide the magazines successively through the transfer position and the two receiving positions (or two transfer positions and a single receiving position). Arbitrary open and closed transport paths and transportation means are possible for the magazines; all of which are considered as being within the scope of the present invention.

Electric motors or electromagnets are provided to drive the moving parts. All moving processes are controlled using appropriate electronic means, preferably on a computer basis. Persons skilled in the art are familiar with such control means and no particular explanation is set forth herein. They are therefore indicated (FIG. 2) symbolically by a block AST only.

Figures 10A, 11A:
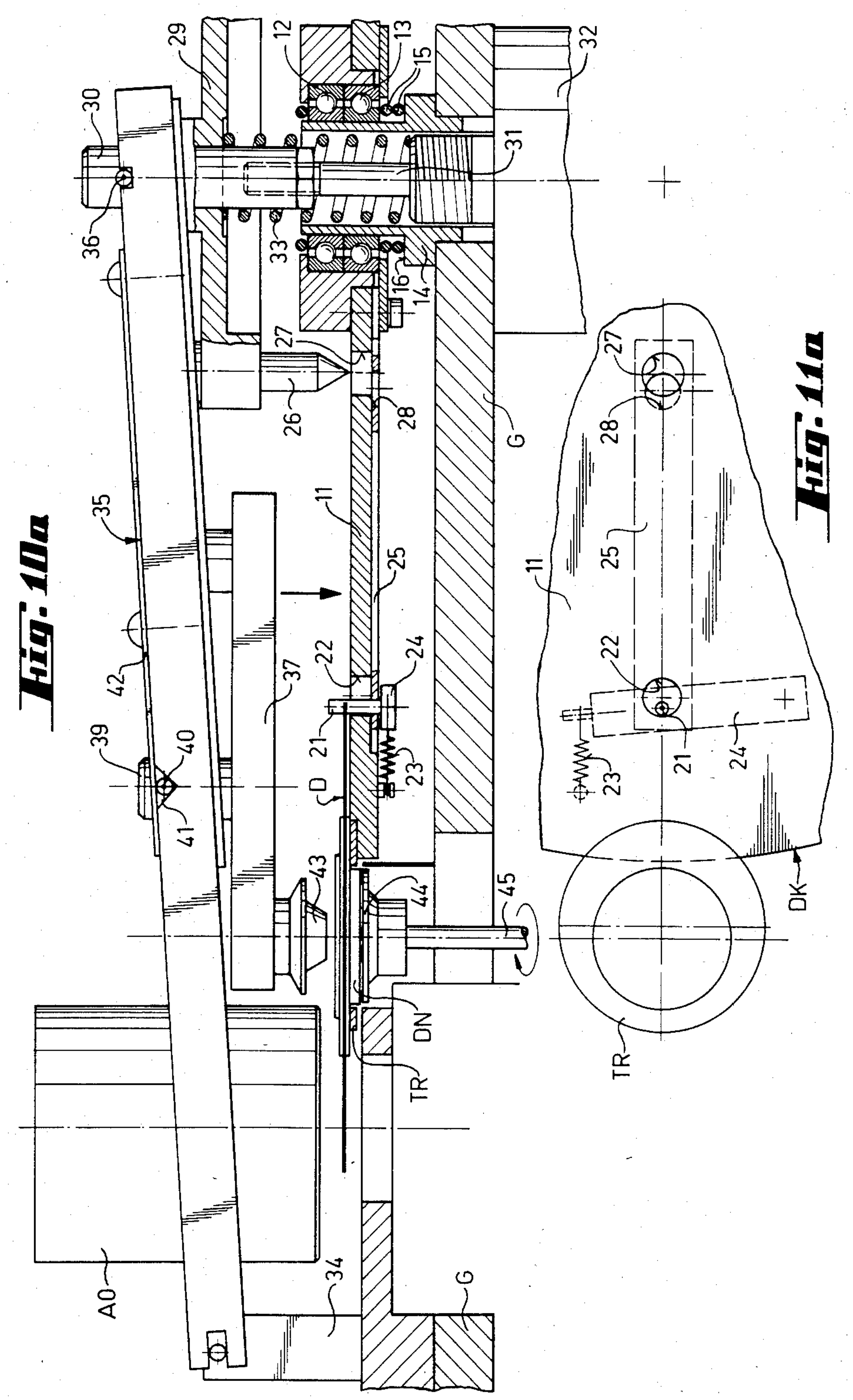

FIGS. 10*a*, *b* and 11*a*, *b* shows details of the carrousel DK, in a section on the line X—X of FIG. 4. The disk carrousel DK essentially consists of a circular plate 11, on the periphery whereof eight support rings TR are arranged for the disks D. The plate 11 is rotatably supported by means of ball bearings 12 and 13 on a bearing socket 14 secured in a base plate G stationarily mounted on the machine. It can be raised and lowered slightly in the axial direction. The vertical support for the plate 11 consists of two elastic O-rings 15, resting on a shoulder 16 of the bearing socket 14.

Figures 10B, 11B:
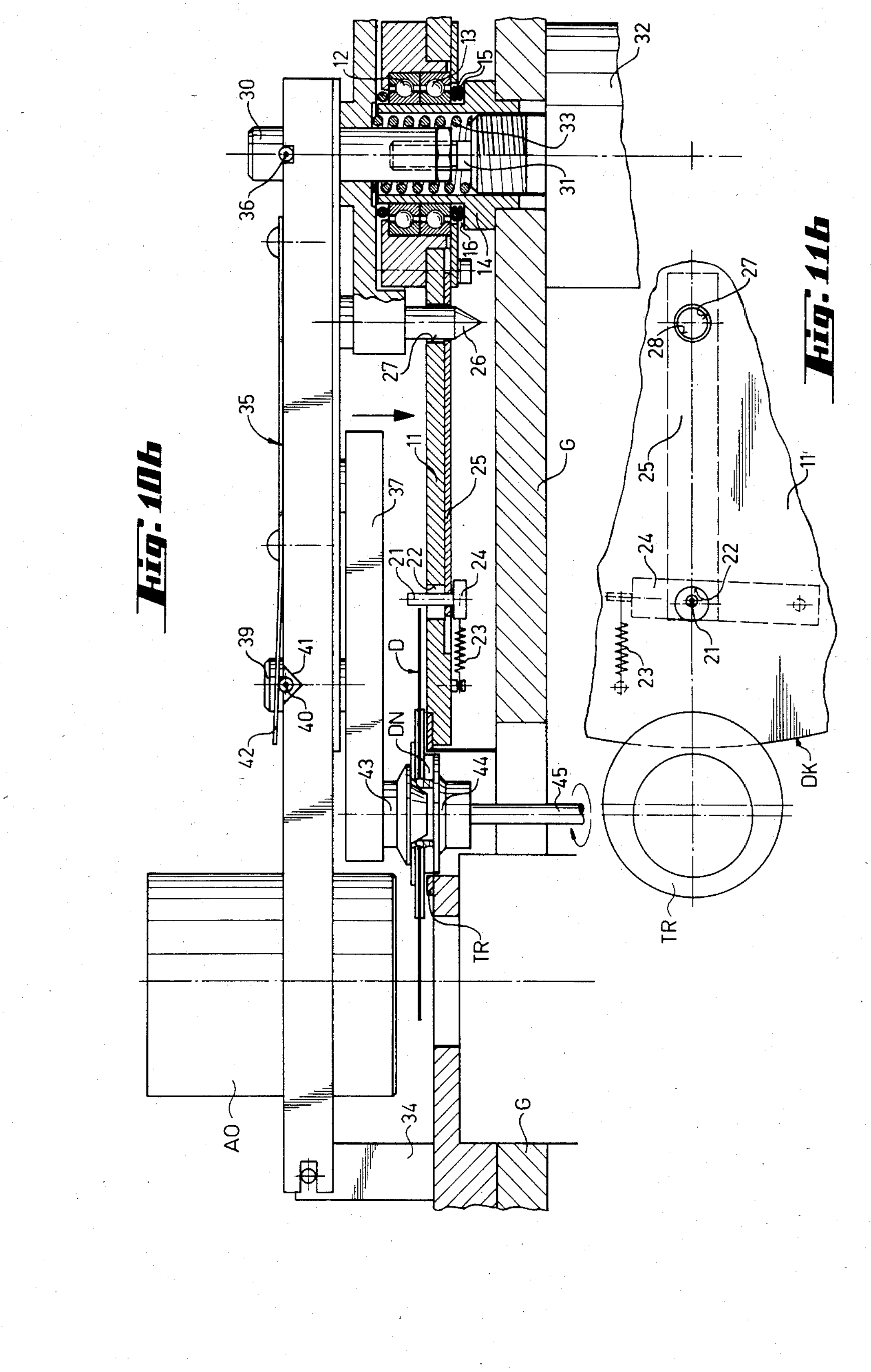

Each support ring TR is associated with a locking pin 21, that is radially displaceable in a bore 22 in the plate 11. A spring 23 holds the pin, through a lever 24, normally in its radially outward position, wherein it engages one of the notches arranged on the circumference of the disk D, thereby immobilizing the disk in a defined rotary position (FIGS. 10*a*, 11*a*). Under the plate 11, eight connecting rods 25 are supported in a radially insertable and extractable manner. By means of these connecting rods 25 the locking pins 21 may be moved inward in the radial direction, thereby disengaging them from the peripheral notches of the disks. The connecting rods are actuated by means of a conical pin 26 that can be displaced through a bore 27 in the plate 11 in the downward direction to engage its conical tip with a bore 28 in the connecting rod 25, thereby displacing it toward the inside (FIGS. 10*b*, 11*b*).

The conical pin 26 rests on a support 29, which is mounted coaxially with the axle of the carrousel DK in a vertically movable manner. The support 29 is located on a bolt 30 and the latter is connected with the threaded stem 31 of a drawing magnet 32 fastened under the base plate G. The threaded stem 31 and the bolt 30 are located within the hollow bearing socket 14. In the socket 14 there is further a helical spring 33, which maintains the support in the upper position shown in FIG. 10*a* when the magnet 32 is not actuated. By means of the magnet 32 the support 29 and thus the pin 26 can be lowered (FIG. 10*b*).

A fork 35 is articulated to a post 34 fastened to the base plate G, at the periphery of the carrousel DK. The inner end of the fork is secured by means of a transverse pin 36 in the center bolt 30 of the support 29. This fork 35 is therefore also moved downwards upon the actuation of the drawing magnet 32 (FIG. 10*b*) and returned by the spring 33 to its normal upper position (FIG. 10*a*). A support plate 37 is mounted on the fork 35 to pivot around a transverse pin 40. A bolt 39 fastened to the support plate 37 is coupled by means of the transverse pin 40, located in a notch 41 of the fork, with the latter. A flat spring 42 fastened to the fork 35 holds the transverse pin 40 resiliently in the notch. At the radially outer end of the support plate a centering pin 43 is mounted, freely rotating around a vertical axis. When the fork 35 and thus the support plate 37 and the centering pin 43 are lowered (FIG. 10*b*), the centering pin 43 engages the hub DN of the disk D resting on a rotating plate 44 and centers it. In this position the transverse pin 40 is slightly raised from the notches 41 of the fork 35, so that position tolerances are compensated for.

The disk D normally is located on the support ring TR of the carrousel DK. With the support 29 lowered, the carrousel DK is lowered simultaneously against the elastic effect of the two O-rings 15, so that the disk is then resting on the rotating plate 44 only and therefore may be turned without interference. The rotating plate 44 is driven by means of a shaft 45 and a motor (not shown).

The disks D must be rotated in the preparation station V, the scanning station A and the printing station K around their own axes. Consequently, appropriate rotating plates 44 (and drives) are provided in the three stations. A conical pin 26 and a centering pin 43 are further associated with each of the stations. The pins 26 are located on a common support 29 and the centering pins 43 are arranged on their common support plate 37; the latter extends therefore over all three of the stations. In this manner the release of the disks may be effected by way of the centering pins 43 in all three stations by means of a single common drive (drawing magnet 32). In the remaining stations of the carrousel DK the disks needed not to be rotated, and consequently no pins 26 are provided for these stations.

An assembly for the photoelectric measuring of the image locations of the disks is designated by AO in FIGS. 10*a* and *b*. Such devices are known and are therefore not described in detail.

As mentioned above, the carrousel DK further comprises a manual insertion station H. This station is freely accessible, so that a test disk or the like may be introduced manually. The electronic control AST (FIG. 2) has a configuration such that in case of a manual insertion the normal loading-unloading cycle to and from the magazines is interrupted and the disk of interest is transported directly in circulation through the individual stations and back to the manual insertion station H.

Figure 12:
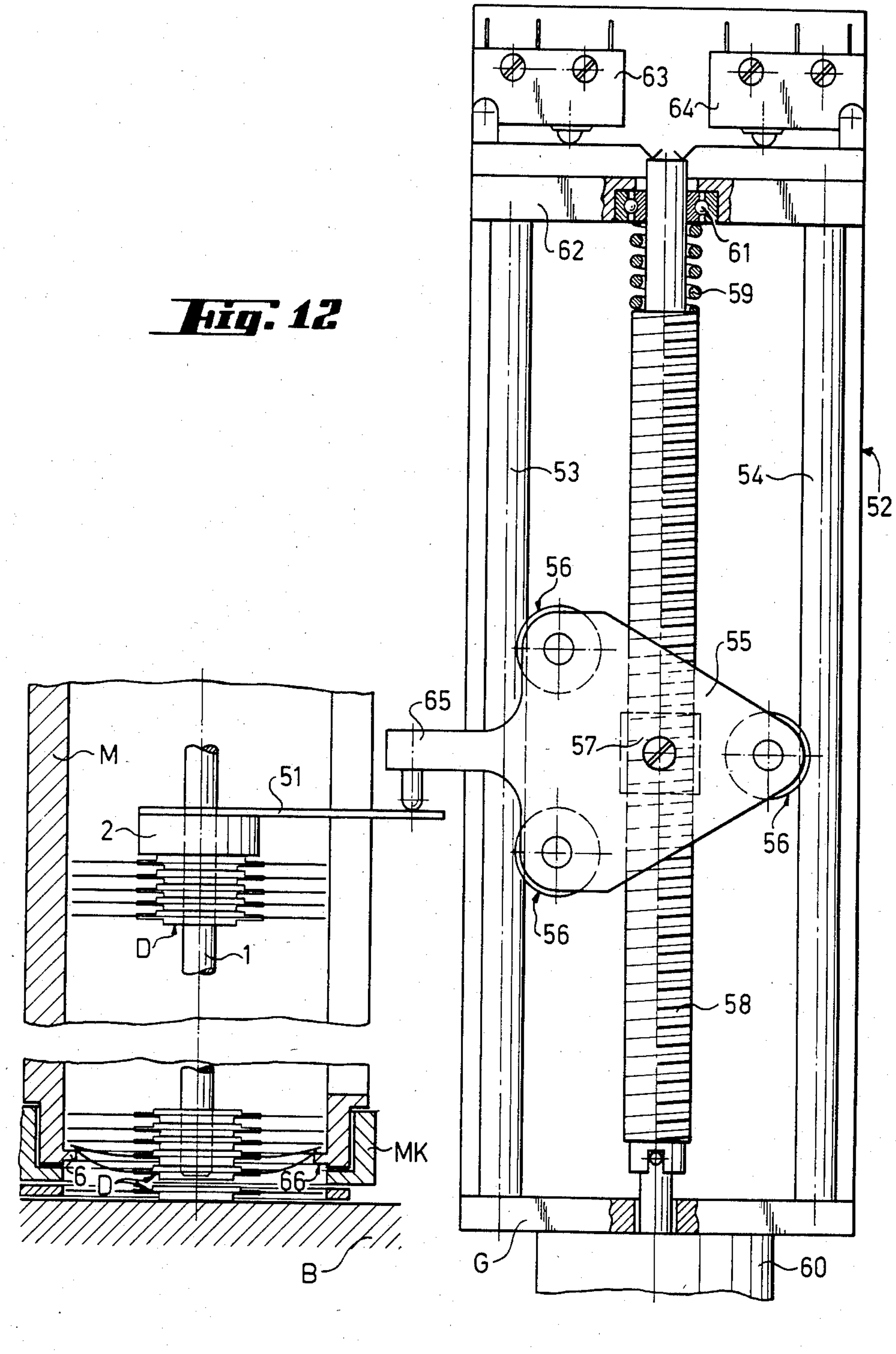
FIG. 12 is a lateral elevation of the ejection drive for the print masters for the magazines in the direction of the arrow XII in FIG. 3.

FIG. 12 shows the magazine ejector drive for the disks in detail. It is arranged at the transfer position MUG of the carrousel MK (FIG. 3) and cooperates with the magazine M (the corresponding magazine half) in that position. The standarized double magazines contain in each half an ejector 2 pressing on the hubs DN of the disks D threaded on the spindle 1. This ejector 2 is actuated by a bow 51 protruding outwardly through the rear wall of the magazine M. This bow is engaged by the drive of the ejector. The ejector drive comprises a frame 52 mounted stationarily on the machine, to which two vertical round rods 53 and 54 are fastened. The latter serve to guide a slide 55 with three rollers 56. In place of the rollers, spherical liners may be provided. The slide 55 is equipped with a clasp nut 57 and may be moved up and down by means of a vertical threaded spindle 58. The spindle 58 is mounted in a slightly axially adjustable manner and is held resiliently in its bottom terminal position by a helical spring 59. A reversing motor 60 serves as the drive. Over the cross head 62 carrying the bearing 61 for the spindle 58, two microswitches 63 and 64 are located, which detect the axial (vertical) position of the threaded spindle 58.

To eject a disk D from the magazine M (upon a corresponding trigger signal from the control AST), the threaded spindle 58 is rotated by the motor 60, so that the slide 55 is moved downward to press the bow 51 of the ejector 2 by means of an arm 65. Immediately following its ejection, the disk D (FIG. **5*b*, for example) comes to rest on the stage B. This resists the further depression of the ejector, thereby blocking the downward motion of the slide 55, which results in a slight upward motion of the threaded spindle 58 against the spring 59. As soon as the switch 63 detects a certain upward deflection of the threaded spindle 58, it causes (through a suitable electronic control device) a reversal of the rotating direction of the motor and thus of the spindle, whereupon the spindles 58 return into their initial position in the downward direction, until the other switch 64 is actuated. Simultaneously, the pressure on the ejector 2 is removed so that the ejected disk rests on the stage B without contact with the following disk (FIG. 5*b***). Upon the initiation of the next ejection command, the process is repeated.

The ejector drive is thus controlled by the counter pressure produced by the disks during ejection. It assures reliably that in each ejection process only a single disk is taken from the magazine.

Figure 13:
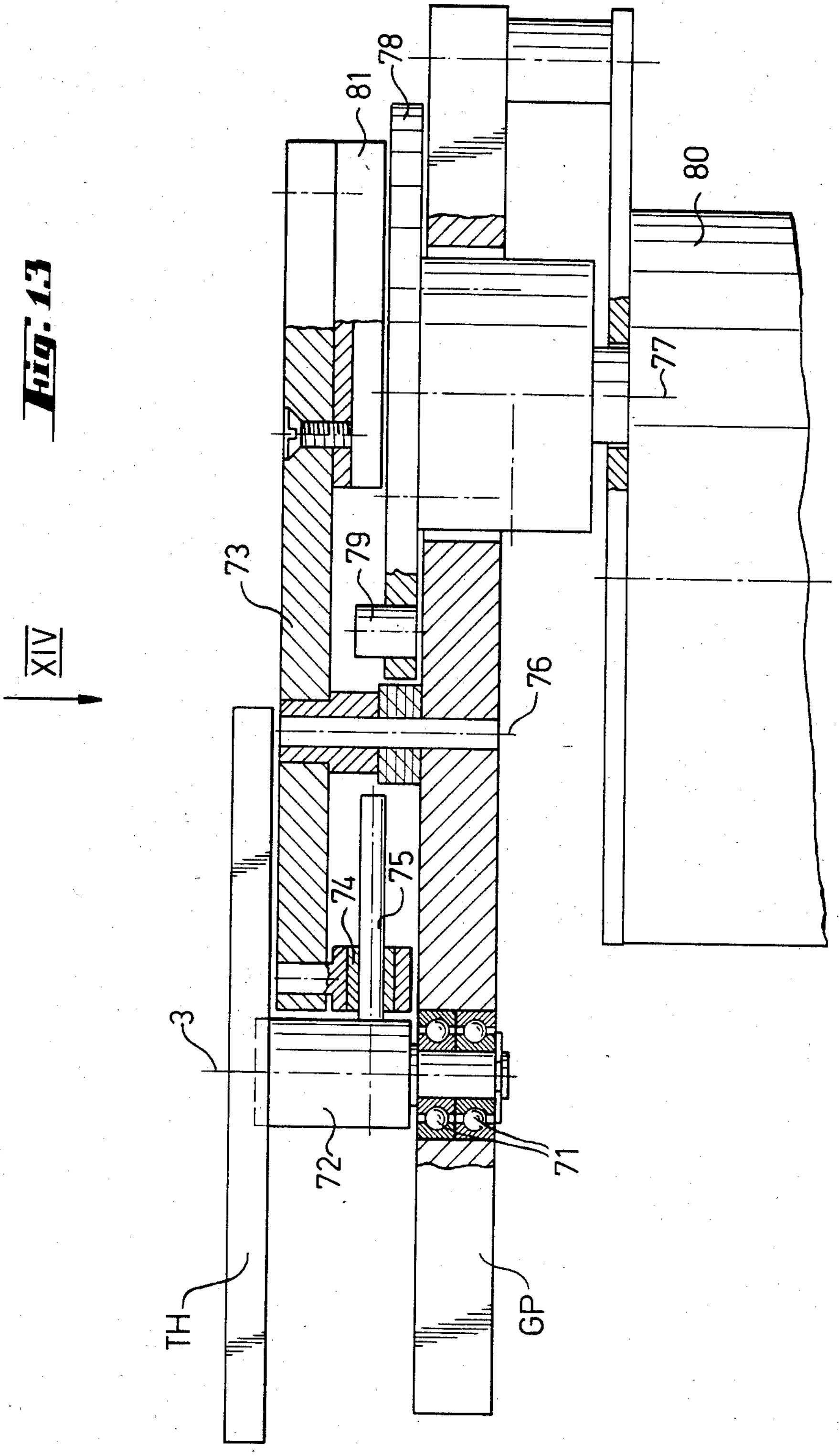
FIG. 13 is a detailed sectional view along the line XIII—XIII of FIG. 3, FIGS. 14*a* and 14*b* are views taken along the arrow XIV in FIG. 13 in two different movement phases.

In FIGS. 13, **14*a* and 14*b*** the drive of the transport lever TH is illustrated in greater detail.

In a base plate GP a rotating body 72 is supported by means of a ball bearing 71, rotatingly around the pivot axis 3 of the lever. It carries the transport lever TH and is joined with it fixedly in rotation. At a distance from the axis 3, a two-arm intermediate pivoting lever 73 is supported in a rotating manner in the base plate GP. On the bottom side of the shorter lever arm, a socket bearing 74 is rotatingly mounted. This bearing guides a connecting rod 75 perpendicular to the lever pivot axis 3, said rod 75 being fixedly connected with the rotating body 72. On the bottom side of the longer arm of the intermediate pivot lever 73 a U-shaped profile 81, open in the downward direction, is located, aligned parallel to the intermediate pivot lever 73. Approximately at the same distance as the rotating body 72 but on the opposite side of the axis 76 of the intermediate pivot lever, a crank disk 78 with a crank pin 79 is rotatably located in the base plate GP and driven in rotation by a drive motor 80. Upon the rotation of the crank disk 78, the crank pin 79 engages in the manner of a Geneva movement the U-shaped profile 81 and pivots the intermediate pivot lever 73 and the transport lever TH by the way of the socket bearing 74, the connecting rod and the rotating body 72.

The mode of operation of the assembly is best illustrated in FIGS. **14*a* and *b***.

Figure 14A:
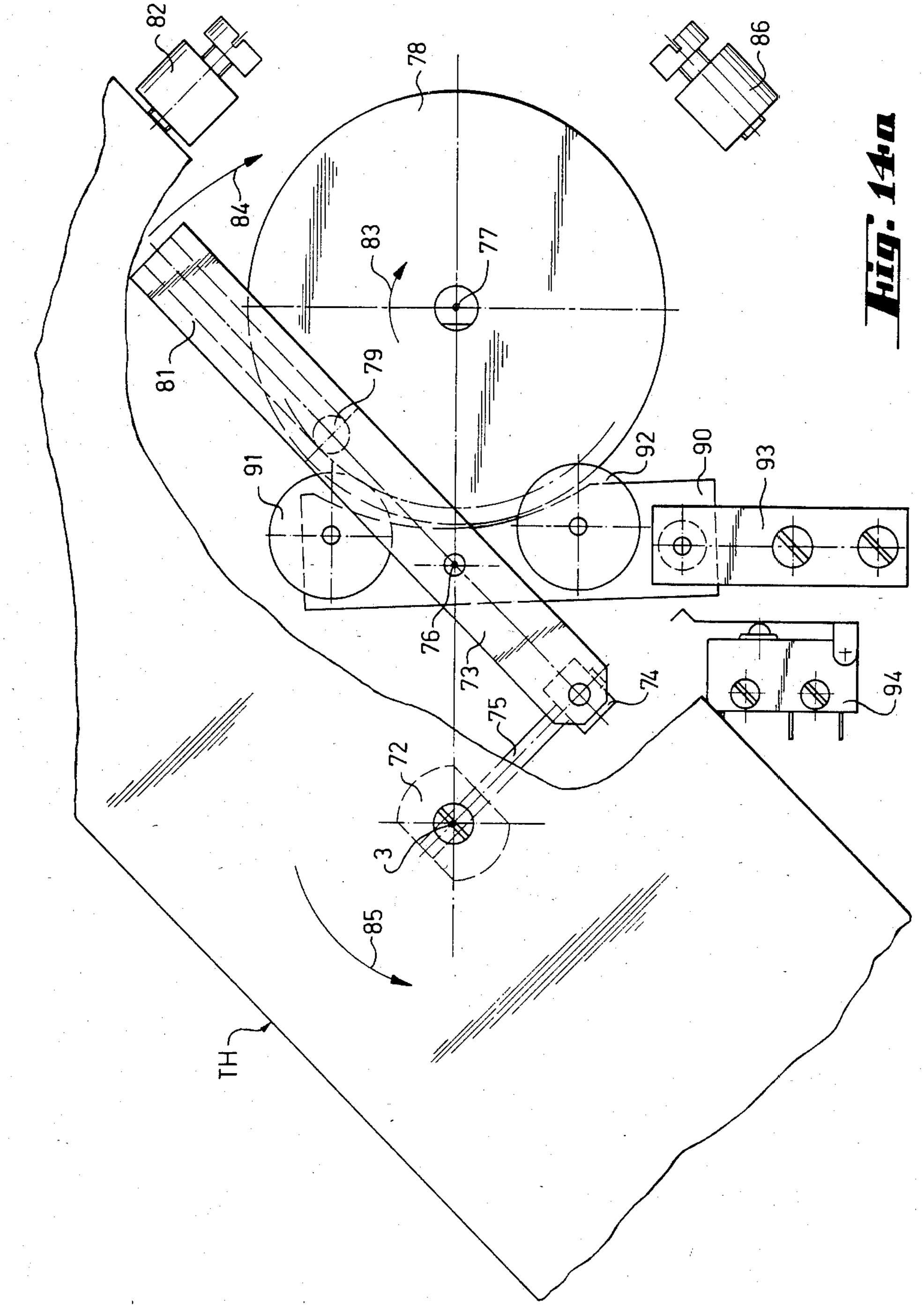
Figure 14B:
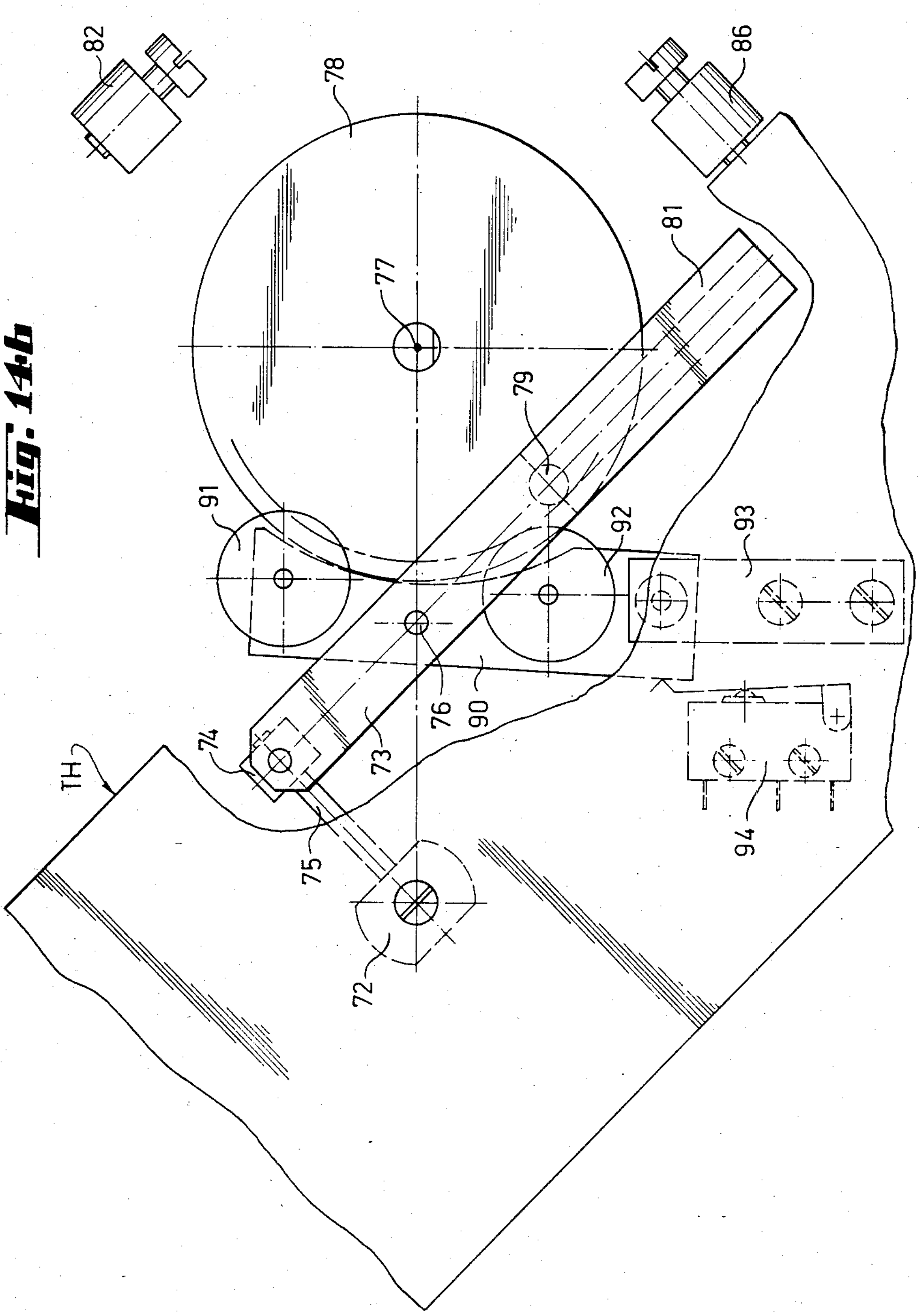

In FIG. **14*a* the transport lever TH is located in one of its terminal positions, wherein it abuts against a stop 82. To pivot it into the terminal position shown in FIG. 14*b*, the crank disk 78 rotates in the direction of the arrow 83, whereby the crank pin 79 engages the U-shaped profile 81 and pivots the intermediate pivot lever 73 in the direction of the arrow 84. By means of the socket bearing 74 and the connecting rod 75, this effects a pivoting of the transport lever TH in the direction of the arrow 85 into the position shown in FIG. 14*b*, wherein it rests against the stop 86. The distance between the axis 76 and the axis of the socket bearing 74 is chosen so that a slight overtravel is obtained and the connecting rod 75 is lightly and elastically stressed (bent), whereby the transport lever is held automatically in an elastic manner against its stop 86, thereby being exactly positioned and held, even if the crank pin 79 during a further rotation of the crank disk 78, for example as the result of an after run motion of the drive motor, leaves the U-shaped member 81 and is thus no longer engaging the intermediate pivoting lever 73**.

To return the transport lever TH into its terminal position shown in FIG. **14*a*, the rotating direction of the crank disk 78 is reversed and all of the processes are effected in the reverse sequence. The connecting rod 75** is again stressed in this terminal position, thereby effecting an exact positioning independently of the position of the crank disk.

In FIGS. **14*a* and *b* an arrangement for the reversal of the rotating direction of the crank disk 78 is further shown. This arrangment comprises a rocker arm 90 pivoting around the intermediate lever axis 76, with two rollers 91, 92, a bow contact 93 and a microswitch 94. The rocker arm 90 cooperates, by means of its two rollers 91 and 92, with the crank pin 79 and is always tilted by the latter into one of the two terminal positions shown. The bow contact 93 acts as a friction brake and retains the rocker arm in the terminal position. In one of the terminal positions the microswitch 94 is actuated (FIG. 14*b*) and not in the other one. The state of the microswitch 94 is evaluated by the central drive control to determine the required rotating direction of the crank disk 78**.

In view of the flip-flop like action of the transport lever TH between its two stops 82 and 86, it is not necessary to abruptly stop the drive motor 80 for the crank disk 78, when the transport lever has attained one of its terminal positions. It is therefore possible to use as the drive motor 80 a common electric motor, with a slight after-run because of mass inertia following deactivation. The motor may be deactivated without special provisions for example by means of a suitably positioned terminal switch.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. Apparatus for the individual ejection of flat objects comprised of a flat, relatively rigid center part and an elastically deformable circumferential part, from a magazine in which the objects are stacked on one another, said magazine including an ejection orifice with a retaining cam that projects inwardly from its wall, comprising an ejector actuable from the exterior of said magazine to apply pressure to said rigid center part of the objects, whereby the entire stack may be moved in the direction of the ejection orifice, a support surface, a holder for positioning the magazine such that its ejection orifice (66) is located at a slight distance above the support surface, drive means for said ejector which induces a force on the ejector to eject an object from the magazine onto the support surface, and means responsive to the counter pressure created by the ejected object on said support surface for relieving the force on said ejector when said counter pressure reaches a limiting value.

2. Apparatus according to claim 1, wherein said ejector drive includes a slide driven by a threaded spindle and operably connected to and movable parallel to said ejector, said threaded spindle being supported in an axially displaceable manner, a spring for maintaining said spindle in a normal position, and means for sensing the axial deflection of the threaded spindle against the force of the spring by the counter pressure that is produced following the ejection of an object and for reversing the direction of rotation of said spindle upon the attainment of said limiting value.

3. Apparatus according to claim 2, wherein said slide is guided by means of rollers on guide rails.

4. Apparatus according to claim 2 wherein said slide is guided on guide rails by means of spherical sleeves.

* * * * *